Dec. 29, 1953   W. B. NOBLE   2,664,321
ROLLER BIT

Filed Sept. 14, 1950   2 Sheets-Sheet 1

Wiley B. Noble
INVENTOR.

BY
Joe E. Edwards

ATTORNEYS

Dec. 29, 1953    W. B. NOBLE    2,664,321
ROLLER BIT
Filed Sept. 14, 1950    2 Sheets-Sheet 2
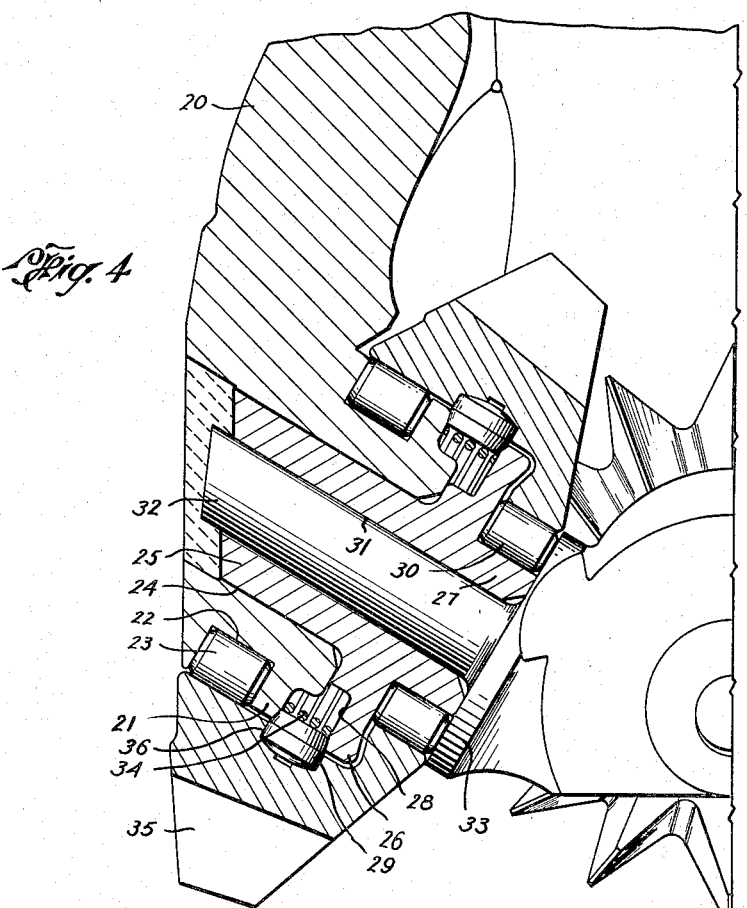
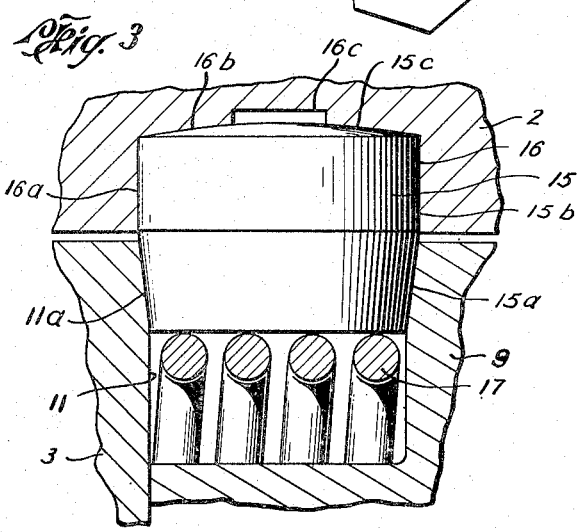
Wiley B. Noble
INVENTOR.
BY
ATTORNEYS Patented Dec. 29, 1953

2,664,321

UNITED STATES PATENT OFFICE 2,664,321

ROLLER BIT

Wiley B. Noble, Houston, Tex., assignor to Reed Roller Bit Company, Houston, Tex., a corporation of Texas Application September 14, 1950, Serial No. 184,819

9 Claims. (Cl. 308—8.2)

This invention relates generally to roller bits for deep well drilling, and particularly to a roller bit having a new and improved bearing for the roller cutters thereof.

Conventional roller bits for the drilling of oil wells include a bit head in which are mounted roller cutters provided with teeth to penetrate the formation when the head is rotated by the usual drill stem. During drilling operations, the bearings of the roller cutters are subjected to very great shocks and strains, including destructive end thrusts. The bearings are also subjected to the abrasive action of mud-laden fluid which is pumped downwardly through the drill stem and bit and rises upwardly in the space between the drill stem and the wall of the well to keep the cutters cool, to remove the cuttings, and to perform other functions well known to those skilled in the art.

The general object of this invention is to provide a roller bit with new and improved bearings.

A specific object of the invention is to provide a roller bit with new and improved end thrust bearing rollers.

Other objects will hereinafter appear.

Figure 1:
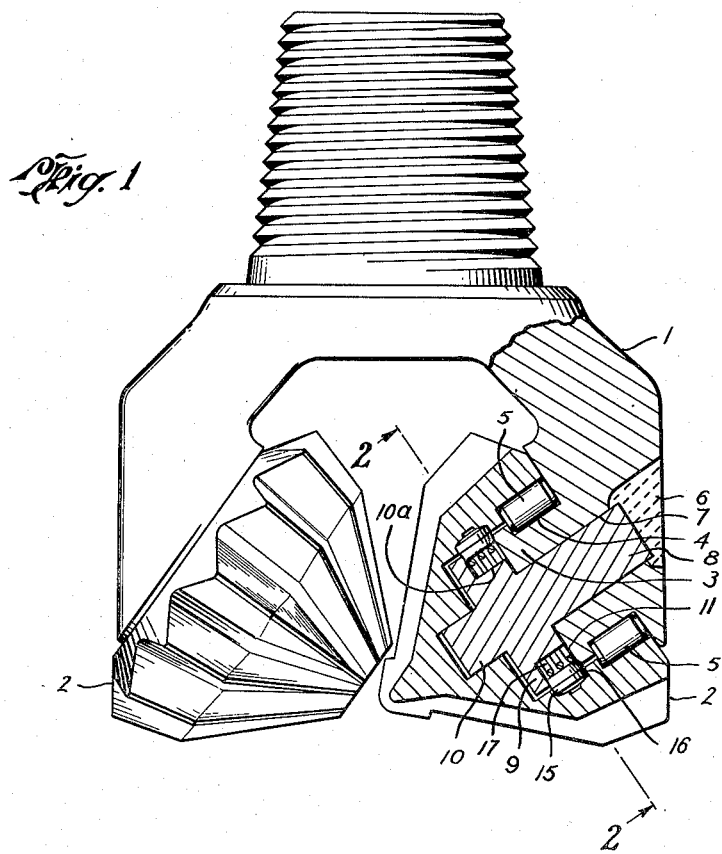
Figure 2:
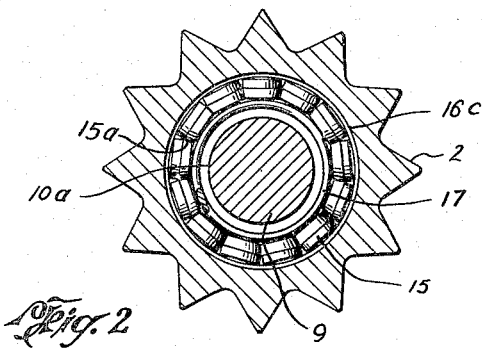

The preferred embodiments of the invention are illustrated by the accompanying drawings in which Fig. 1 is a partly sectional elevation of a roller bit of the cone type; Fig. 2, a section on the line 2—2 of Fig. 1; Fig. 3, a detail view of the thrust bearing rollers and associated parts; and Fig. 4, a fragmentary sectional view illustrating a side roller cutter assembly for the conventional cross roller cutter bit.

Referring to Fig. 1, the bit head is indicated at 1 and the roller cutters at 2. The head 1 is provided with a recess in its bottom defined by upwardly converging walls from which project downwardly and inwardly annular flanges, one of which is indicated at 3, providing a raceway 4 for the load sustaining bearing rollers 5. Welded as indicated at 6 in the bore 7 in the head 1 is a shaft 8 having an annular flange 9 and a reduced extension 10. The extension 10 may provide a load sustaining friction bearing for the point of the cone, or, if desired, bearing rollers may be substituted in place of the friction bearing. The flange 9 has a reduced portion 10-a so that the shaft 8 will form with the flange 3 on the head a raceway 11 for my new and improved thrust bearing rollers 15.

The thrust bearing rollers 15 are rotatable on axes substantially radial to the axis of rotation of the cutter 2.

As shown in detail in Figs. 2 and 3, these rollers 15 include a tapered portion 15-a, a substantially cylindrical portion 15-b and a rounded end portion 15-c. The tapered portion 15-a may be described as frusto-conical, its major diameter being substantially the same as the diameter of the cylindrical portion 15-b. The rounded portion 15-c may be a spherical segment.

The raceway 11, which may be referred to as a shaft raceway, has inwardly tapered side walls 11-a, and the tapered portions 15-a of the thrust bearing rollers 15 bear against these side walls 11-a. The cutter 2 is provided with a raceway 16 and this cutter raceway 16 has substantially parallel side walls 16-a and a rounded bottom 16-b provided with an annular groove 16-c. The cylindrical portion 15-b of the thrust bearing roller 15 bears against the parallel side walls 16-a of the cutter raceway 16; and the rounded end 15-c of the thrust bearing roller 15 bears against the rounded bottom 16-b of the cutter raceway 16.

Within the shaft raceway 11 is a coiled spring 17 which serves to yieldably urge the thrust bearing rollers 15 outwardly into their operative positions.

The parts may be assembled as follows: The shaft 8 having been placed in the cutter 2, the thrust bearing rollers may then be inserted in the cutter raceways 16. Then the coil spring 17 may be compressed to a diameter smaller than its normal diameter and inserted between the thrust bearing rollers 15 and the reduced portion 10-a of the flange 9 of the shaft 8. The load rollers 5 having been placed in the raceway 4 and held therein by heavy grease or the like, the cutter 2 with the shaft 8, thrust rollers 15 and spring 17 therein may be placed over the annular flange 3 and load rollers 5, the shaft 8 entering the bore 7 and being welded in place as indicated at 6.

It will be apparent from Fig. 1 that the load on the cutter will be sustained by the bearing rollers 5 and the friction bearing 10, and that the end thrust will be sustained by the thrust bearing rollers 15 intermediate of the same.

The tapered portions 15-a of the thrust bearing rollers 15 perform an important function, When an end thrust is exerted on the bearing, the tapered portions 15-a, bearing against the tapered side wall 11-a of the shaft raceway 11, tend to urge the thrust rollers 15 outwardly into their operative positions. The spring 17 constitutes a resilient means to urge the thrust rollers 15 outwardly into, and to hold the same in, their operative positions. When the thrust rollers 15 become worn, the spring 17 urges the thrust rollers outwardly and thereby compensate for wear by maintaining the thrust rollers 15 in their outer operative positions. The bearing area between the ends 15-c of the rollers 15 and the bottom 16-b of the cutter raceway 16 is a relatively large area because the said end and bottom are rounded. The annular groove 16-c in the bottom of the cutter raceway 16 serves as a channel for lubricant and also as a trap for abrasive material to reduce wear on the end 15-c of the roller 15.

The diameter of the thrust roller 15 is greater than its length. This results in an acute angle between the direction in which a longitudinal thrust is exerted and the direction in which that thrust is transmitted from the cutter to the shaft through the roller 15.

As will appear in Fig. 2, the tapered surfaces 15-a bear against each other and since the thrust rollers 15 rotate on axes substantially radial to the axis of rotation of the cutter 2, the tapered portions 15-a roll upon each other and thus provide a good bearing between the thrust rollers 15.

Referring now to the side roller cutter assembly shown by Fig. 4, the cross roller bit head is indicated at 20. It is provided with a downwardly and inwardly extending flange 21 having raceways 22 for the load rollers 23. Fitting within the bore 24 of the head is a bushing 25 having an annular flange 26 and a reduced extension 27. The annular flange 26 on the bushing 25 forms with the annular flange 21 on the head 20 a raceway 28 for my new and improved thrust bearing rollers 29. The numeral 30 indicates load rollers on the reduced extension 27 of the bushing 25. Extending through a bore 31 in the bushing 25 is the side roller cutter pin 32. The pin 32 is integral with and extends upwardly and outwardly from the bridge 33.

The thrust bearing rollers 29 are the same as the thrust bearing rollers 15 shown by Figs. 1, 2 and 3 and in the raceway 28 is a coiled spring 34 which corresponds with the coiled spring 17 shown by Figs. 1, 2 and 3. The side roller cutter 35 is provided with a raceway 36 which is the same as the raceway 16 shown by Figs. 1, 2 and 3.

The parts shown by Fig. 4 may be assembled as follows: The bushing 25 is placed within the cutter 35. The load rollers 30 are placed between the reduced extension 27 of the bushing 25 and the cutter 35. The thrust bearing rollers 29 are then placed in the cutter raceway 36 and the spring 34 is compressed to a diameter smaller than its normal diameter and inserted within the circle of thrust bearing rollers 29. The load rollers 23 are placed on the raceway 22 and the cutter 35 is then placed over the rollers 23 and flange 21. The pin 32 may then be inserted through the bore 31 in the bushing 25 and welded in place as indicated at 37.

The invention is not limited to the preferred embodiments herein disclosed. Various changes within the scope of the following claims will be apparent to those skilled in the art.

I claim:

1. A bit having a shaft; a roller cutter rotatable on said shaft; said shaft having a raceway with inwardly tapered side walls, said cutter having a raceway with substantially parallel side walls and a rounded, grooved bottom; thrust bearing rollers in said raceways, rotatable on axes substantially radial to the axis of rotation of said cutter, and having tapered inner portions to bear against each other and against the tapered side walls of said shaft raceway, a substantially cylindrical portion to engage the substantially parallel side walls of said cutter raceway, and a rounded end to engage the rounded bottom of said cutter raceway; a spring in said shaft raceway to urge said rollers outwardly into their operative positions; and load sustaining bearings on each side of said thrust bearing rollers.

2. A bit having a shaft; a roller cutter rotatable on said shaft; said shaft having a raceway with inwardly tapered side walls, said cutter having a raceway with a rounded bottom; thrust bearing rollers in said raceways, rotatable on axes substantially radial to the axis of rotation of said cuter, and having tapered inner portions to bear against each other and against the tapered side walls of said shaft raceway, and a rounded end to engage the rounded bottom of said cutter raceway; a spring in said shaft raceway to urge said rollers outwardly into their operative positions; and load sustaining bearings on each side of said thrust bearing rollers.

3. A bit having a shaft; a roller cutter rotatable on said shaft; said shaft having a raceway with inwardly tapered side walls, said cutter having a raceway; thrust bearing rollers in said raceways, rotatable on axes substantially radial to the axis of rotation of said cutter, and having tapered inner portions to bear against each other and against the tapered side walls of said shaft raceway; a spring in said shaft raceway to urge said rollers outwardly into their operative positions; and load sustaining bearings on each side of said thrust bearing rollers.

4. A bit having a shaft; a roller cutter rotatable on said shaft; said shaft having a raceway, said cutter having a raceway; thrust bearing rollers in said raceways and rotatable on axes substantially radial to the axis of rotation of said cutter; a spring in said shaft raceway to urge said rollers outwardly into their operative positions; and load sustaining bearings on each side of said thrust bearing rollers.

5. A bit having a shaft, a roller cutter rotatable on said shaft, said shaft and cutter having raceways, one of said raceways having tapered side walls, thrust bearing rollers in said raceways, said rollers being rotatable on axes substantially radial to the axis of rotation of said cutter and having tapered portions bearing against each other and against the said tapered side walls of said raceway, and yieldable means to urge said rollers into their operative positions in said raceways.

6. A bit having a shaft, a roller cutter rotatable on said shaft, said shaft and cutter having raceways, one of said raceways having tapered side walls, and thrust bearing rollers in said raceways, said rollers being rotatable on axes substantially radial to the axis of rotation of said cutter and having tapered portions bearing against each other and against the said tapered side walls of said raceway.

7. A bit having a shaft, a roller cutter rotatable on said shaft, said shaft and cutter having raceways, and thrust bearing rollers in said raceways, said rollers being rotatable on axes substantially radial to the axis of rotation of said cutter and having tapered portions bearing against each other.

8. A bit having a shaft, a roller cutter rotatable on said shaft, raceways in said shaft and cutter, thrust bearing rollers in said raceways and rotatable on axes substantially radial to the axis of rotation of said cutter, and yieldable means to urge said rollers into their operative positions in said raceways.

9. A bit having a shaft, a roller cutter rotatable on said shaft, said shaft having a raceway with tapered side walls, said cutter having a raceway, and thrust bearing rollers in said raceways, said thrust rollers being rotatable on axes substantially radial to the axis of rotation of said cutter and having tapered portions bearing against each other and the said tapered side walls of said raceway.

WILEY B. NOBLE.

References Cited in the file of this patent

UNITED STATES PATENTS

| Number | Name | Date |
|---|---|---|
| 1,106,065 | Vandegrift | Aug. 4, 1914 |
| 1,760,317 | Pickin | May 27, 1930 |
| 2,284,427 | Hufferd | May 26, 1942 |
| 2,293,603 | Francis | Aug. 18, 1942 |